Figure 1:
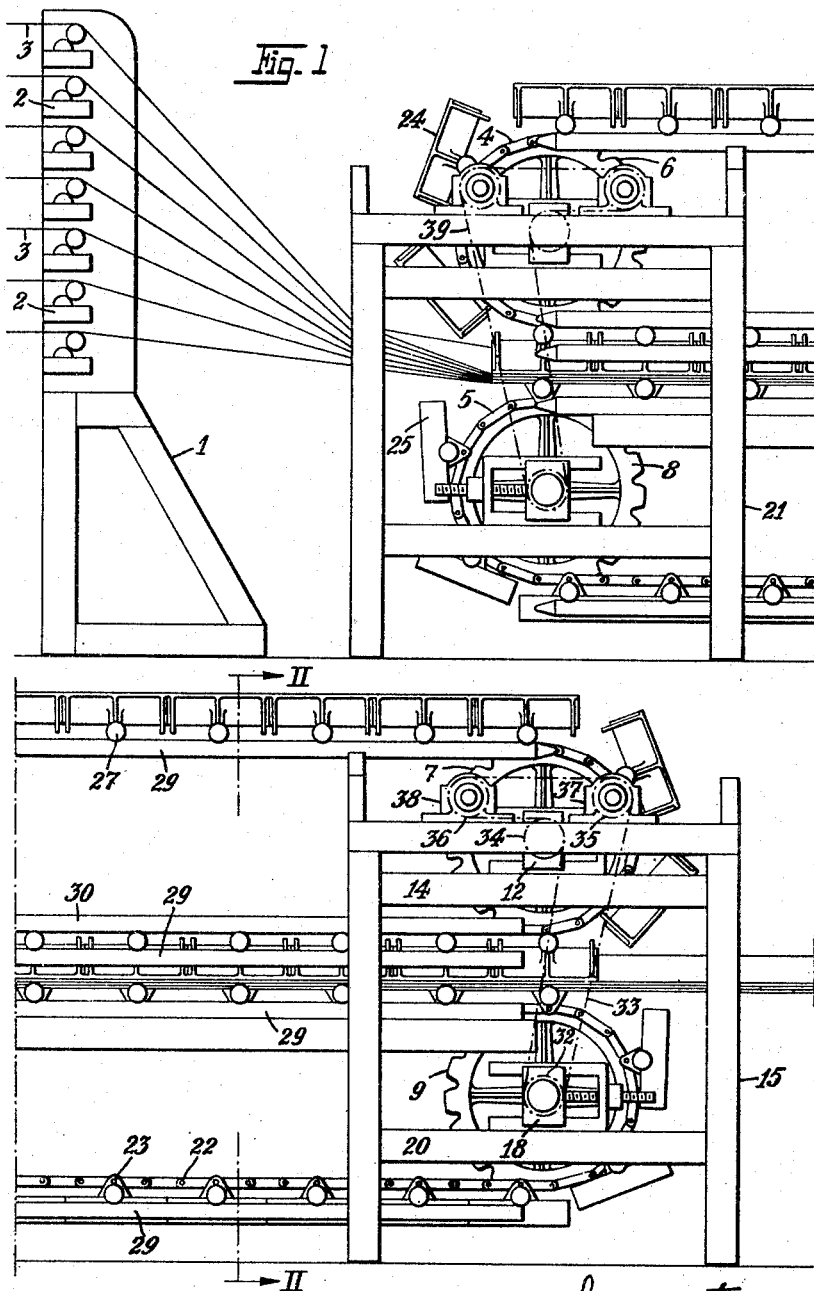

Sept. 25, 1956   G. A. A. FORSELL   2,764,219
MACHINE FOR MAKING LAMINATED ANGULAR CORNER PROTECTORS
Filed May 21, 1951   2 Sheets-Sheet 1

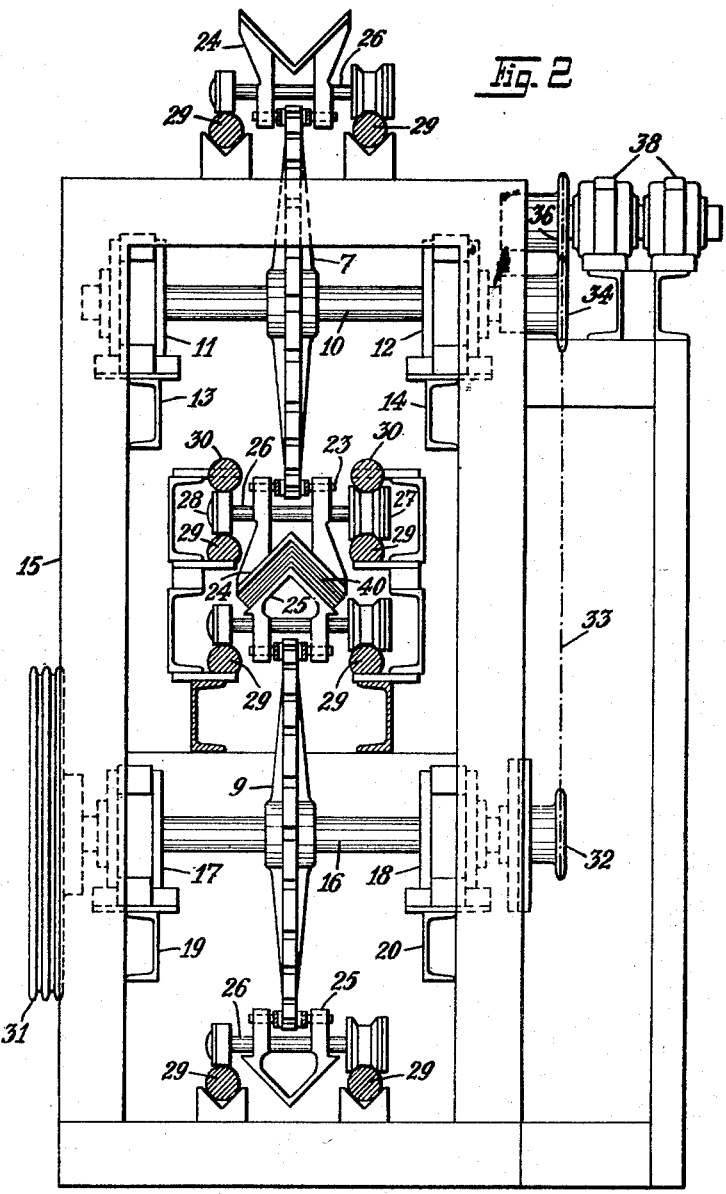

United States Patent Office 2,764,219
Patented Sept. 25, 1956

2,764,219

MACHINE FOR MAKING LAMINATED ANGULAR CORNER PROTECTORS

Gösta A. A. Forsell, Varnamo, Sweden

Application May 21, 1951, Serial No. 227,463

3 Claims. (Cl. 154—1.8)

The invention relates to a method of and a machine for making corner protectors. For packing purposes corner protectors of different kinds are used to space articles from the walls of the container and to protect the angular edges from damage.

An object of the invention is to manufacture corner protectors, preferably from materials such as paper and paper-board, in a simple and economic manner.

Another object is to obtain a corner protector of a considerable length to be cut at will in shorter pieces either in connection with the manufacture or after storing of such lengths.

A further object is to manufacture a continuous string to be cut in corner protecting pieces of desired lengths.

With these and other objects in view the invention will be hereinafter fully described, reference being made to the accompanying drawing in which:

Figure 1 is an elevation of the left and the right ends of a machine according to one form of the invention; and Figure 2 is a sectional view along line II—II in Figure 1.

In the drawing 1 is a frame carrying a plurality of adhesive-applying devices 2 arranged in a vertical row one above the other. They may be designed in any known manner but are preferably provided with rotatable cylinders to be coated with an adhesive, such as gum or water glass, provided in a container, from which the adhesive is transferred by means of a second cylinder. From rolls not shown in the drawing substantially endless strips or bands of material 3 are drawn over the pasting devices of which the lowest one serves only as a guide roller there being no adhesive in the container. The rollers in the frame 1 serve to guide the strips toward the dies so that all the strips are simultaneously bunched together by the dies impressing their shape on the combined strips which shape thereafter is maintained continuously by the dies throughout their joint travel through the machine. The strips may be of paper or other material but preferably of corrugated board composed of a smooth layer and a corrugated layer glued together. The lowest strip, however, may consist only of paper or a fabric.

The machine is further provided with two vertical endless chains 4, 5 located above and at a distance from each other. The upper chain 4 passes over two sprocket wheels 6, 7 and the lower chain 5 over sprocket wheels 8, 9. The wheel 7 is carried by a shaft 10 with bearings 11, 12 resting on supports 13, 14 provided on a frame 15, and the wheel 9 is carried by a shaft 16 in bearings 17, 18 on supports 19, 20. The sprocket wheels 6, 8 are arranged in a similar manner in a frame 21.

Each chain is composed of double links with ordinary pins 22 and longer pins 23 engaging the sprocket wheels. The pins 23 extend beyond the chain at both sides thereof and each swingably carries a female die 24 on the chain 4 and a male die 25 of another type on the chain 5. The dies 24 have the pressing surface formed of two plane surfaces at a right angle to each other so as to form a chute or channel, and the dies 25 have a corresponding ridge shape. The dies 24 and 25 have fixed transverse shafts 26 provided with rollers 27, 28 running on parallel rails 29 along the upper and lower straight portions of the chains. Pressing rails 30 are provided above the rollers of the lower straight part of the chain 4 to prevent the corresponding dies from being raised during the operation of the machine. The material strips 3 are drawn in between pairs of dies and are bunched together and bent by the dies to an angle shape corresponding to the pressing surfaces of the dies, and the composite body is thereafter maintained under pressure during its passage through the machine in order to be dried and to obtain its definite form.

The lower chain 5 is driven by means of a wheel 31 at one end of the shaft 16 carrying the sprocket wheel 9. Another sprocket wheel 32 at the opposite end of the shaft 16 is by means of a chain 33 in driving connection with a sprocket wheel 34 fastened to the shaft 10 for driving the upper chain 4 in the opposite direction in relation to the chain 5. For this purpose the chain 33 passes over two further runners 35, 36 fixed on a shaft having bearings 37, 38. The chain 33 engages the sprocket wheel 34 in such a way that the wheels 7 and 9 are caused to rotate in opposite directions. At the other end of the machine the wheels 6 and 8 are connected in a similar manner by means of a chain 39.

From the foregoing it might be clear that the channel-shaped composite body 40 is subjected to a continuous pressure between the dies 24, 25, and as the dies in each chain abut the adjacent clamp the body 40 is pressed over its whole upper and lower surface, but it is compressed only slightly and to a certain extent determined by the position of the rails 29, 30.

If necessary the dies in the lower chain 5 at the entrance end may be guided by stationary means to a correct entrance position. Between the frames 1 and 21 the strips 3 may pass through a heating chamber, and the dies may also be heated in any suitable manner in order to promote drying of the glue. For this purpose heated air may be used in which case the two adjacent parts of the endless chains 4 and 5 may pass through a drying chamber.

The body 40 is obtained from the machine as a continuous string and may be cut directly into short corner protectors of a desired length, preferably by means of a saw movable to and fro along the string. The body may also be cut in long lengths which may be stored and thereafter cut into corner protectors of desired length. Instead of dies forming a single and preferably right angle dies may be used which have two preferably right angles to form a U-shaped composite body to be cut into short U-shaped protectors serving the purpose of protecting two corners and the intermediate wall of an article to be packed. It is also possible to divide the composite body in its longitudinal direction by means of a stationary saw at the output end of the machine whereby two angle-shaped composite bodies are obtained.

In order to attain that the longitudinal end surfaces of the shanks of the composite body form a substantially right angle to the adjacent surfaces the width of the paper strips 3 in Fig. 1 may increase from the uppermost strip to the lowest one.

I claim:
1. In a machine for making laminated angular corner protectors formed with at least one angle, a series of adhesive-applying devices comprising parallel guide rollers for applying adhesive to elongated strips of sheet material as said strips pass over said rollers, a further guide roller in said series located below said first-mentioned rollers, two endless chains mounted one above the other and each carried by two sprocket wheels having horizontal shafts at substantially the same level, a series of male dies provided on one of said chains, a series of female dies provided on the other of said chains, the operative surfaces of said dies forming at least one angle with the edges extending perpendicularly to the said shafts for bunching the separate strips together and bending and pressing said strips together to form an angle, and means for driving said chains at the same speed, so that the shape of said dies is impressed on the combined strips and the shaping effect of said dies is maintained on all of said strips throughout their joint travel between said dies.

2. In a machine for making laminated angular corner protectors formed with at least one angle, a series of adhesive-applying devices comprising parallel guide rollers for applying adhesive to elongated strips of sheet material as said strips pass over said rollers, said series of rollers also including a further guide roller located below said first mentioned rollers, two endless chains mounted one above the other and each carried by two sprocket wheels having horizontal shafts at substantially the same level, a series of male dies mounted on one of said chains, a series of female dies mounted on the other of said chains, the operative surfaces of said dies forming at least one angle with the edges extending perpendicularly to the said shafts for bunching the separate strips together and bending and pressing the strips together to form an angle, two rollers pivotally mounted one on each side of the center of each die, longitudinally directed rails supporting said rollers along a horizontal portion of said chains, means for driving said chains at the same speed, so that the shape of said dies is impressed on the combined strips and the shaping effect of said dies is maintained on all of said strips throughout their joint travel between said dies.

3. A machine for making laminated angular corner protectors according to claim 2, and in which said chain is provided with transversely extending pins which pass through said chain and which are spaced apart from each other longitudinally of said chain, said dies each being swingably mounted on one of said pins respectively.

References Cited in the file of this patent

UNITED STATES PATENTS

| | | |
|---|---|---|
| 1,815,887 | Agar | July 28, 1931 |
| 1,909,513 | Agar | May 16, 1933 |
| 1,944,280 | Snyder | Jan. 23, 1934 |
| 2,230,621 | Loew | Feb. 4, 1941 |
| 2,331,067 | Young | Oct. 5, 1943 |
| 2,431,353 | Varner et al. | Nov. 25, 1947 |
| 2,446,038 | Amigo | July 27, 1948 |
| 2,454,074 | Marc | Nov. 16, 1948 |
| 2,499,908 | Figge | Mar. 7, 1950 |
| 2,504,473 | Van Antwerpen | Apr. 18, 1950 |